United States Patent
Donnerdal et al.

(10) Patent No.: US 6,440,305 B1
(45) Date of Patent: Aug. 27, 2002

(54) FUEL FILTER

(75) Inventors: Ove Donnerdal, Sävedalen; Håkan Larsson, Mölndal, both of (SE)

(73) Assignee: Aktiebolaget Electrolux, Stockholm (SE)

( * ) Notice: Subject to any disclaimer, the term of this patent is extended or adjusted under 35 U.S.C. 154(b) by 0 days.

(21) Appl. No.: 09/486,456

(22) PCT Filed: Aug. 24, 1998

(86) PCT No.: PCT/SE98/01504
§ 371 (c)(1),
(2), (4) Date: Feb. 25, 2000

(87) PCT Pub. No.: WO99/10075
PCT Pub. Date: Mar. 4, 1999

(30) Foreign Application Priority Data

Aug. 26, 1997 (SE) .............................................. 9703069

(51) Int. Cl.⁷ .............................................. B01D 35/02
(52) U.S. Cl. ........................ 210/342; 210/461; 210/462; 210/463; 210/497.01; 210/510.1
(58) Field of Search ................................ 210/315, 342, 210/459, 460, 462, 463, 496, 497.01, 497.2, 497.3, 510.1, 487

(56) References Cited

U.S. PATENT DOCUMENTS 3,211,292 A * 10/1965 Bull ............................ 210/342
4,036,758 A * 7/1977 Combest ..................... 210/223
4,411,788 A   10/1983 Kimura
4,561,977 A   12/1985 Sasaki

FOREIGN PATENT DOCUMENTS

EP          414098      *  2/1991
EP       0 475 610 A1      3/1992

* cited by examiner

Primary Examiner—Matthew O. Savage
(74) Attorney, Agent, or Firm—Pearne & Gordon LLP

(57) ABSTRACT

A submersible fuel filter device (1) of suctional type is connectable to the end of a fuel inlet hose (2) in a fuel tank and comprises a filter (3) consisting of porous plastic with a surrounding outer wall (10) with an upper border (11), a lid (4) provided with an outlet opening (24) that covers the filter (3) and is connected to the outer wall's upper border. The filter is embodied like a cup-shaped body and has a through flow thickness, or material thickness, which is considerably smaller than the other dimensions of the body, and its porosity is less than 10 μm. The inlet suction hose (2) is connected to said outlet suction opening (24).

9 Claims, 1 Drawing Sheet

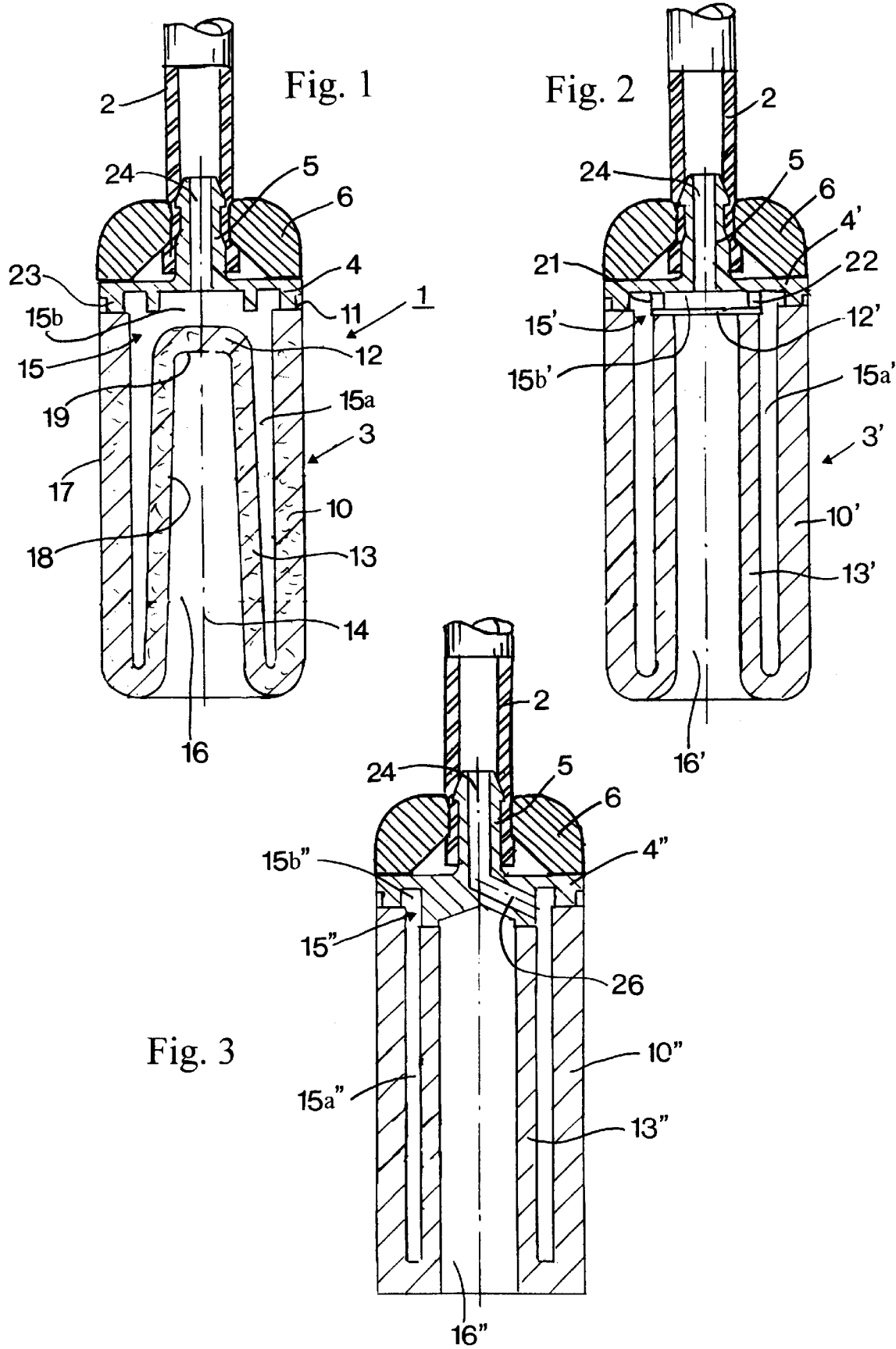

FUEL FILTER

TECHNICAL FIELD

The subject invention refers to a submersible fuel filter device of suctional type, connectable at the end of a fuel inlet hose in a fuel tank. More precisely the invention refers to a fuel filter device provided with a filter body with an outlet port connected to the inlet hose, and mainly intended for usage in handheld working tools, such as chain saws, which are to be handled in a variety of positions during work.

BACKGROUND OF THE INVENTION

A submersible fuel filter device of the kind mentioned above, which since a long time has been manufactured and used by the applicant, comprises a coaxial body with a central filtration chamber, which is connected to an outlet port as well as an inlet hose, and outside the filtration chamber there are two coaxial filter walls with an intermediate, annular space containing a metal ring, which serves as a sinker. A limitation with this kind of fuel filter is that the filter surface is small in relation to the outer dimensions of the filter. Furthermore the sinker, which is movable in the annular chamber, could damage the filter.

As an example of the state of the art in the patent literature reference is made to the filter devices described in EP 0 246 036, U.S. Pat. Nos. 4,851,118 and 5,441,637.

A general problem concerning todays fuel filters of the kind specified above is that they are so coarse, i.e. they have so great porosity, that, on the one hand a non-desirable degree of pollution passes through the filter and on the other hand that an essential amount of dirt particles get stuck inside the filter causing that it will be filled up gradually. This leads to frequent service regarding cleaning and changing of fuel filter and also it seems to increase the wear of the engine.

SUMMARY OF THE INVENTION

Fuel filter devices of the kind mentioned in the preamble are mass-produced articles and used in a number of movable and/or portable machines run by an internal combustion engine, such as lawn movers, chain saws, power cutters, brush cutters, grass trimmers etc. A purpose of the invention is to offer a submersible fuel filter device of the kind mentioned above, provided with a filter, which is designed so that it provides a large, active filter surface in combination with a fine porosity and still very small outer dimensions. Besides the fact that the filter device thereby gets the possibility to comply with the high functional demands, such as filtration capability, durability etc., it should also be designed so that it enables a simple and low cost mass production. Both these requirements, i.e. adequate function and simple/low cost design, have not earlier been possible to combine in a satisfactory way. The first purpose of the subject invention is to solve this problem. This and other purposes can be achieved in that the invention is having the characteristics appearing from the independent claim. In this manner a relatively large filter surface of a cup-shaped filter body with small material thickness has been combined with a filter material with extremely fine porosity, i.e. less than 10 $\mu$m. Preferably a porosity less than or equal to 5 $\mu$m is used. Traditionally such a fine porosity of a filter body of moderate size is considered to result in a too high flow resistance when the filter is new, as well as the filter will be filled up very quickly. Normally a filter material with a porosity between 20 $\mu$m and 80 $\mu$m is used for this type of filter. However, at testings it has turned out, which is surprising, that the filter according to the invention was filled up much more slowly than a conventional filter. And at the same time the flow resistance could be mastered. The mechanism behind this matter of fact is considered to be that almost the total amount of dirt particles are being built up on the filter surface and will not get stuck inside the filter material. This in combination with a high degree of self-cleansing through fuel wash in the tank as well as washing in connection with tank fillings seems to be the explanation to the extremely good results obtained. About 10 times longer lifetime for this filter is obtained compared to a conventional filter. And at the same time a considerably more thorough filtration is obtained. The applicant doesn't know of any filter of this kind having such an extremely fine porosity. On the other hand there exist two-stage filters having a more coarse prefilter as well as a more fine main filter and with a porosity of approximately 5–15 $\mu$m. In that case the main filter is a so called "volume filter", where the fuel in an axial direction flows through a long filter block located in the fuel pipe. The filter block is gradually being filled up by the dirt particles which have passed through the prefilter. For obvious reasons this "volume filter" could hardly have any self-cleansing capacity. Further purposes, characteristics and aspects of the invention will become apparent from the submitted claims and from the following description of some preferred embodiments.

BRIEF DESCRIPTION OF THE DRAWING FIGURES.

In the following description of some preferred embodiments reference is made to the attached drawing figures, where FIG. 1 shows an axial section through a fuel filter device in accordance with a first preferred embodiment of the invention.

FIG. 2 shows an axial section through a fuel filter device in accordance with an alternative embodiment, and FIG. 3 shows a longitudinal section through a fuel filter device in accordance with yet another alternative embodiment.

DETAILED DESCRIPTION OF THE EMBODIMENTS

Firstly, referring to FIG. 1 a submersible filter device is generally designated by numeral 1 and a fuel inlet hose for an internal combustion engine by numeral 2. The filter device 1 comprises only three details, namely the filter 3 itself, a lid 4 with a nipple 5 for the hose 2, and a metal clamp ring 6, which at the same time serves as a sinker. The filter 3 and the lid 4 are joined together to one unit, here denominated as filter body.

All these three details, i.e. the filter 3, the lid 4 and the clamp ring 6 are usually rotation-symmetricly designed which is meant to facilitate manufacturing.

The filter 3 consists of a porous plastic material with communicating pores of such a size that they can permit particles of a maximum size, i.e. a filter porosity of 10 $\mu$m, to pass through. Preferably the porosity is so fine, i.e. the pores are so small that particles of a size of 5 $\mu$m are not allowed to pass through. Different forms of porous plastics are conceivable, e.g. the filter could be made of cellular plastic (foam plastic), but preferably it is produced from very fine plastic granules, which have been loaded in a moulding hollow space, where the plastic granules under heat influence are made to stick together, i.e. to sinter, in order to form a coherent, porous body. Many different types of thermoplastic polymers, or combined polymers, can be used, such as polyethene, polypropene, polyamide, polystyrole, polyester, polyurethane etc. Also polymer mixtures are in fact conceivable.

The filter is designed like a cup-shaped body with a surrounding outer wall 10 with an upper border 11. A lid 4 provided with an outlet suction port 24 is covering the filter 3 and connected to the outer wall's upper border 11. Since the filter is shaped like a cup a relatively large filter surface is achieved. Also the bottom of the cup contributes to create this surface, compare the dash-dotted part shown in the lower part of FIG. 1. Many filters have instead an impenetrable bottom surface since their filter material is kept fixed between gables in both ends. The purpose of the sinker is to make sure that the filter device, irrespective of the inclination of the fuel tank, is being immersed into the very bottom part of the tank where the fuel of course is flowing. The sinker is preferably located on the upper side of the lid 4', i.e. the side opposite the connecting side of the filter. In this manner the sinker will not reduce the active filter area, which should have happened with an external or internal location of it onto or into the filter. This location of the sinker is thus very advantageous and the applicant doesn't know of any filter having this kind of location of the sinker. In many cases such a location should have made the raised bottom shown in the figures impossible.

The bottom of the cup can also be raised, which is shown by continuous lines in the FIGS. 1–3. Hereby the filter surface can be increased still more and the height of the filter can be decreased. This is an obvious advantage in most cases. Owing to the raised bottom it has been possible to decrease the axial length of the filter by approximately 25–30% in the shown case. However, there are also other ways to create an especially large filter surface. If one or several indentations in the exterior filter surface is being made and these indentations are extending in an axial direction, then an enlarged surface is created. Seen in a sectional view the filter will thus look like an island with one or several bays. Such indentations can be made along some part of the filter length, but they can also be made along the whole length of the filter and even in the lid 4. In this case the fuel hose could preferably be lead through the corresponding cut when the filter is taken out from the tank for cleaning or replacing purposes. In a case where an indentation has been given the maximum size the filter will look like a C in a sectional view. This will provide a very large filter surface and can be referred to as another preferred embodiment. However, still the basic form of the filter is that it is shaped like a cup.

The filter has a through flow thickness or material thickness, which is considerably smaller than the other dimensions of the filter body. Preferably the material thickness is only as large as what is required to give the filter body enough mechanical durability. For, its material thickness can be larger at the upper border of the outer wall where the mounting onto the lid is arranged. Since the filter material has such an extremely fine porosity the filtration is almost only taking place at its surface. It means that a material thickness, which is larger than should be necessary regarding strength, only increases the through flow resistance, which is undesirable. In the shown embodiments the material thickness is preferably less than 3 mm, which is representing approximately 15% of the outer diameter of the filter or its largest measure in cross-section.

The filter 3, shown by continuous-lines in the FIGS. 1–3, is in principle shaped like a cylindrical cup and has a bottom part which is raised extremely high up into the centre part of the cup. It is also conceivable that the filter 3 has an exterior form which is widening slightly upwards. However, according to the embodiment the surrounding outer wall is cylindric and denominated by numeral reference 10. The outer wall is ending up with an upper border 11. The extremely highly raised centre part 12 is almost reaching, but not completely, up to the upper border 11. In this manner a surrounding inner wall 13 on a distance from the filter centre 14 with annular filtration chamber 15a between the outer wall and the inner wall is created. Furthermore, inside the inner wall 13 and under the raised centre part 12 there is a space 16, which, while the filter device is being submersed into the fuel, is filled up with fuel to be filtrated, so that the outside 17 of the outer a wall as well as the inside 18 of the innerwall are forming exposed filter surfaces against the fuel. Also the underside 19 of the raised centre part 12 is forming a filter surface. The space 15b above the raised centre part 12 is part of the integrated filtration chamber 15. Seen in an axial sectional view the filter 3 is thus mainly-formed like a W. It could also be described as a double-folded body seen in a cross-sectional view. By having this form the filter gets a relatively large filter surface in proportion to its outer dimensions. In an embodiment where the height of the filter 3 is hardly 40 mm and the outer diameter is approximately 20 mm the active filter surface would thus in total be approximately 3000 mm². A filter with these dimensions is in first hand intended for relatively large fuel tanks. For machines with smaller fuel tanks the measure of the filter should be chosen so that the active filter surface will be in total approximately 1500 mm². If the porosity should be maximum 10 $\mu$m according to the above mentioned definition, preferably maximum 5 $\mu$m, the relation of A/P would in any case be larger than 150 mm²/$\mu$m, preferably at least 300 mm²/$\mu$m, where A=the active filter area expressed in mm² and P=the maximum porosity expressed in $\mu$m. Under these conditions a satisfactory filtration in combination with a not too high flow resistance resulting from filling up can be achieved. Instead an opportunity for larger particles to form a cake on the filter surface is created, which is advantageous from a functional point of view.

The lid 4 consists of a circular washer with an annular flange 23, which is facing against and waterproofly fixed to the filter's 3 upper border 11, for instance by glueing or welding. The nipple 5, which has a conventional design, is extending up from the centre part of the lid 4. An outlet suction duct 24 (outlet suction opening) is extending through the nipple 5 as a connection between the filtration chamber 15 and the hose 2.

The clamp ring 6 is made of either steel, brass, zinc or another comparatively hard metal and has a strong design in order to function both for mounting of the hose 2 onto the nipple 5 and as a sinker for the entire filter device 1, so that said filter device irrespective of the inclination of the fuel tank always is being immersed into that part of the fuel tank which at the moment is filled with fuel. In case the clamp ring should be made of steel preferably it should be produced from a blank pipe, which by turning gets the desirable shape, and whereupon the clamp ring is galvanized. The advantage of brass before steel is that it has a larger density—brass has the density of 8.4 à 8.8 g/cm², while steel has the density of approximately 7.8 g/cm²—and no galvanizing is required. Furthermore, a ring made from brass can be produced by casting or hot pressing. On the other hand brass is more expensive than steel. Zinc has the density of 7.2 g/cm² and is comparatively cheap and just as brass it offers the opportunities to manufacture the ring by casting or hot pressing. Therefore zinc could be considered as the most suitable material for the clamp ring 6, which ought to have a weight over 10 g for fuel filter devices of the dimension normally required for fuel tanks for smaller machines. Preferably the weight should be somewhere between 10 and 20 g.

The outer diameter of the ring 6 corresponds to the outer diameter of the lid 4 as well as the filter 3, and the inner diameter is somewhat larger than the smallest diameter of the nipple 5 in order to achieve an efficient mounting of the hose 2 onto the nipple 5.

When the filter device 1 is in use the fuel is being sucked into the filtration chamber 15 through the filter surfaces 17, 18, 19 and through the walls 10, 13 and the raised bottom 12 and further through the duct 24 into the hose 2. On the filter surfaces 17, 18, 19 and/or in the layer closest to the surfaces a filter cake is gradually being deposited, which apparently essentially makes the filter function as a surface filter.

In the embodiment according to FIG. 2 the filter 3' consists of two coaxial pipes, which are connected to each other in one end, so that an annular filtration chamber 15a' is created between the two pipes with the outer wall 10' and the inner wall 13'. The raised bottom as referred to in the preceding embodiment is thus missing, but replaced by a round plastic disc 12', which is pressed between an upper around going border on the inner wall 13' and protrusions 22 on the lid 4'. Between the protrusions 22 there are passages 21 between the annular filtration chamber 15a' and a central filtration chamber 15b'. The two spaces 15a' and 15b' are together forming the integrated filtration chamber 15', which communicates with the hose 2 via the duct 24 in the nipple 5. The function is otherwise the same as in the embodiment according to FIG. 1.

In the embodiment according to FIG. 3 the filter 3" has in principle the same design as in the embodiment according to FIG. 2. The difference is mainly seen in the design of the filtration chamber 15" and the design of the lid 4". The integrated filtration chamber 15" comprises the annular space 15a" between the outer- and inner walls 10" and 13" as well as the smaller, annular space 15b" in the area for the lid 4". This space 15b" is communicating by an oblique duct 26 with the central passage 24 in the nipple 5. Remaining details are the same as described in the preceding embodiments as well as the functioning of the device. The details identical with the preceding ones are given the same reference designations, while the details directly corresponding to the preceding ones but with another design are provided with the designation".

What is claimed is:

1. A submersible, suction fuel filter device (1) connectable to an end of a fuel inlet hose (2) in a fuel tank, the device comprising:

a lid (4) having an outlet suction port (24), the inlet hose (2) being connectable to the outlet suction port (24); and a filter (3) having an outer peripheral wall (10) extending along an axis (14) and an inner peripheral wall (13) extending along the axis (14), the outer and inner peripheral walls (10 and 13) bounding a filtration chamber (15), the outer and inner peripheral walls (10 and 13) being defined by a contiguous porous plastic filtering material that also defines a connection of the filtering material joining the outer and inner peripheral walls (10 and 13), an inner side of the lid (4) being engaged with the outer peripheral wall (10) at a distal end from the connection of the outer and inner peripheral walls (10 and 13), the inner peripheral wall (13) extending from the connection of the outer and inner peripheral walls (10 and 13) to a distal end located promiate the lid (4).

2. A device according to claim 1, wherein the device is provided with a sinker (6) which makes sure that the device irrespective of the inclination of the fuel tank is being immersed into that part of the fuel tank which for the moment is filled up with fuel, and in that the sinker (6) is located on the outer side of the lid (4).

3. A device according to claim 2, characterized in that the sinker 6) is composed of a clamping device for mounting of the hose (2) onto a nipple (5) on the lid(4).

4. A device according to claim 3, characterized in that the sinker (6) is composed of an annular clamping device which is adaptrd to be positioned on to the nipple (5) on the outside (2) of the hose.

5. A device according to claim 1, wherein said space (16') inside the inner wall (13') in an axial direction is delimited by a disc (12') which is pressed between the inner wall (13') and the lid (4').

6. A device according to claim 1, wherein the space (16") inside the inner wall (13") in an axial direction is delimited by the lid (4") which is sealingly combined with the distal ends of the outer wall (10") and the inner wall (13") respectively.

7. A device according to claim 1, wherein the filtration chamber (15) is annular about the axis, and the inner periperial wall (13) bounds a space (16), which, while the device is submersed in fuel, is filled with fuel to be filtrated.

8. A device according to claim 1, wherein the filter is rotationally symmetric about the axis (14).

9. A device according to claim 8, wherein the distal end of the inner peripheral wall (13) connects with a centre part (12) made of the contiguous filtering material.

* * * * *

UNITED STATES PATENT AND TRADEMARK OFFICE
CERTIFICATE OF CORRECTION

PATENT NO. : 6,440,305 B1
DATED : August 27, 2002
INVENTOR(S) : Ove Donnerdal et al.

It is certified that error appears in the above-identified patent and that said Letters Patent is hereby corrected as shown below:

Title page,
Item [30], Foreign Application Priority Data, please delete "9703069", and insert therefor -- 97030069 --.

Column 6,
Line 1, after "having", please insert -- an outer side with --.

Signed and Sealed this

Tenth Day of December, 2002

JAMES E. ROGAN
*Director of the United States Patent and Trademark Office*